(12) United States Patent
Kunishige

(10) Patent No.: US 6,172,704 B1
(45) Date of Patent: Jan. 9, 2001

(54) FILM SCANNER APPARATUS

(75) Inventor: Keiji Kunishige, Hachioji (JP)

(73) Assignee: Olympus Optical Co., Ltd., Tokyo (JP)

( * ) Notice: Under 35 U.S.C. 154(b), the term of this patent shall be extended for 0 days.

(21) Appl. No.: 08/801,302

(22) Filed: Feb. 18, 1997

(30) Foreign Application Priority Data

Feb. 16, 1996 (JP) .................................................. 8-029668

(51) Int. Cl.⁷ .................................................. H04N 5/253
(52) U.S. Cl. .................................................. 348/96
(58) Field of Search .................................................. 348/96

(56) References Cited

U.S. PATENT DOCUMENTS

| | | | | |
|---|---|---|---|---|
| 5,337,164 | * | 8/1994 | Yabe | 348/96 |
| 5,546,122 | * | 8/1996 | Asami | 348/96 |
| 5,752,114 | * | 5/1998 | Saito | 348/96 |
| 5,790,716 | * | 8/1998 | Tazawa | 348/96 |
| 5,805,206 | * | 9/1998 | Yokonuma | 348/96 |

FOREIGN PATENT DOCUMENTS 5-145838   6/1993   (JP) .

* cited by examiner

*Primary Examiner*—Howard Britton
(74) *Attorney, Agent, or Firm*—Volpe and Koenig PC

(57) ABSTRACT

A film scanner apparatus which is capable of accepting a plurality of film pictures different in film scene size from each other. The film scanner apparatus includes a line sensor for reading out a picture on the film scene, a scene size decision section for determining the size of the film scene and a selection section for selecting effective pixels of the line sensor in accordance with the decision result of the scene size decision section. A picture display is made on the basis of the outputs of the effective pixels chosen by the selection section.

20 Claims, 15 Drawing Sheets

FILM SCANNER APPARATUS

BACKGROUND OF THE INVENTION

1. Field of the Invention

The present invention relates to a film scanner apparatus, and more particularly to a film scanner apparatus which is capable of taking or picking up pictures from plural kinds of films.

2. Related Art Statement

As such a film scanner apparatus dealing with pictures on plural kinds of films, there has been known a film player, exemplified by Japanese Unexamined Patent Publication No. 5-145838, which accepts a cartridge-housed film and a piece film (i.e. a film strip). However, the technical means disclosed in the Japanese Unexamined Patent Publication No. 5-145838 can cope with only films with the same scene size but not dealing with plural kinds of films having different scene sizes. For dealing with the plural kinds of films with different scene sizes, a converter lens would have to be mounted in accordance with a scene size to equalize the picking range on a solid-state image pick-up device such as CCD (Charge Coupled Device). However, this causes the size increase and complication of the apparatus which goes against making the apparatus more compact and cutting down its manufacturing cost.

OBJECTS AND SUMMARY OF THE INVENTION

Accordingly, it is a first object of the present invention to provide a film scanner apparatus which can cope with plural kinds of films with different scene sizes without leading to the size increase and complication of the apparatus.

A second object of this invention is to provide a film scanner apparatus which is capable of accomplishing an extremely easy-to-see picture display without displaying a useless and complicated picture outside a film scene even if scanning plural kinds of films with different scene sizes.

A third object of this invention is to provide a film scanner apparatus which is capable of visually confirming what kind of film corresponds to a target picture.

A fourth object of this invention is to provide a film scanner apparatus which is capable of visually confirming the film type corresponding to a target picture and further which is easy to use without destroying the performance in operation of a preview scene.

Briefly, a film scanner apparatus according to the present invention which allows the input of pictures of a plurality of films with different scene sizes, comprises:

a line sensor for reading out a picture on the film scene;

a scene size decision section for deciding (i.e. determining) the film scene size; and a selection section for selecting effective pixels (picture elements) of the line sensor in accordance with a decision result of the scene size decision section, wherein a picture display is made on the basis of the outputs from the effective pixels selected by the selection section.

These as well as other objects and advantages of the present invention will become further apparent from the following detailed explanation.

DETAILED DESCRIPTION OF THE PREFERRED EMBODIMENTS

Figure 1:
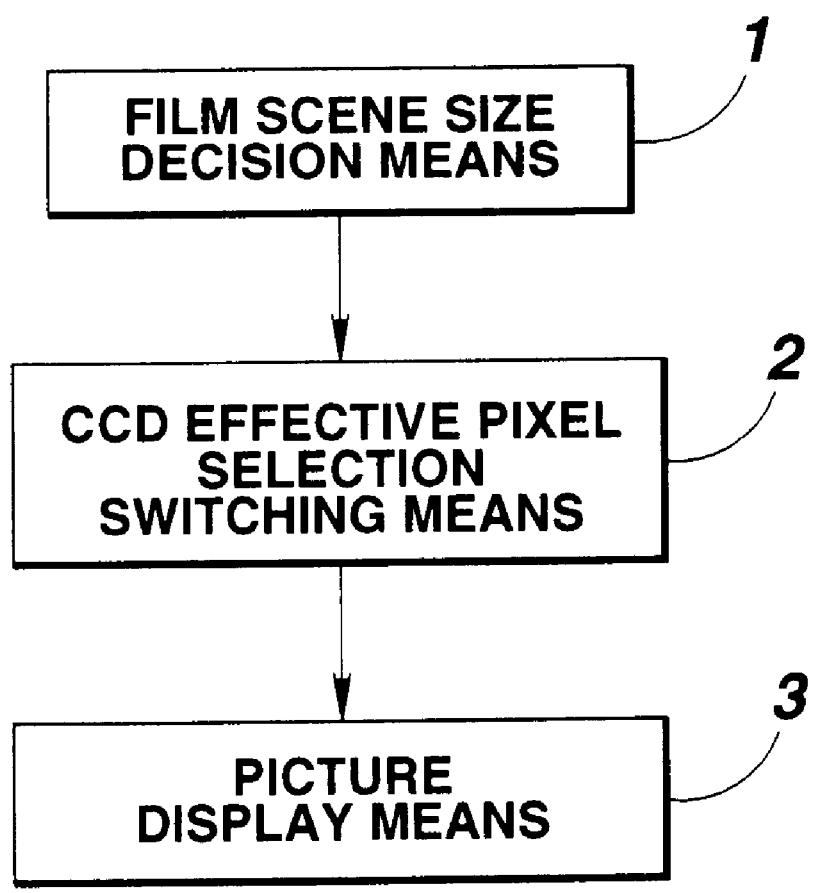
FIG. 1 is a block diagram schematically showing an arrangement of a film scanner apparatus according to an embodiment of the present invention.
Figure 2:
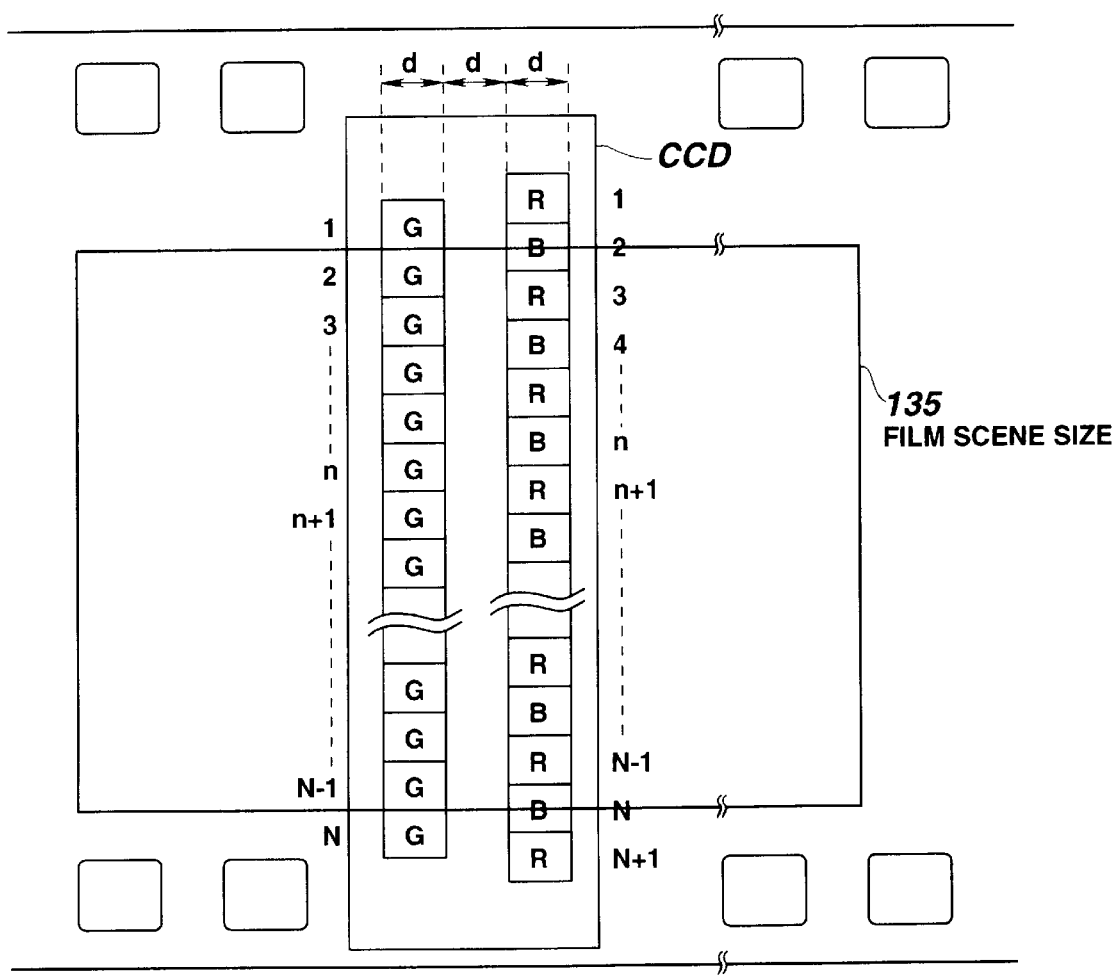
FIG. 2 is a simple illustration useful for describing a solid-state image pick-up device for taking pictures and a film scene undergoing the picture extraction when a JIS135 type film is loaded in the film scanner apparatus according to this embodiment.
Figure 3:
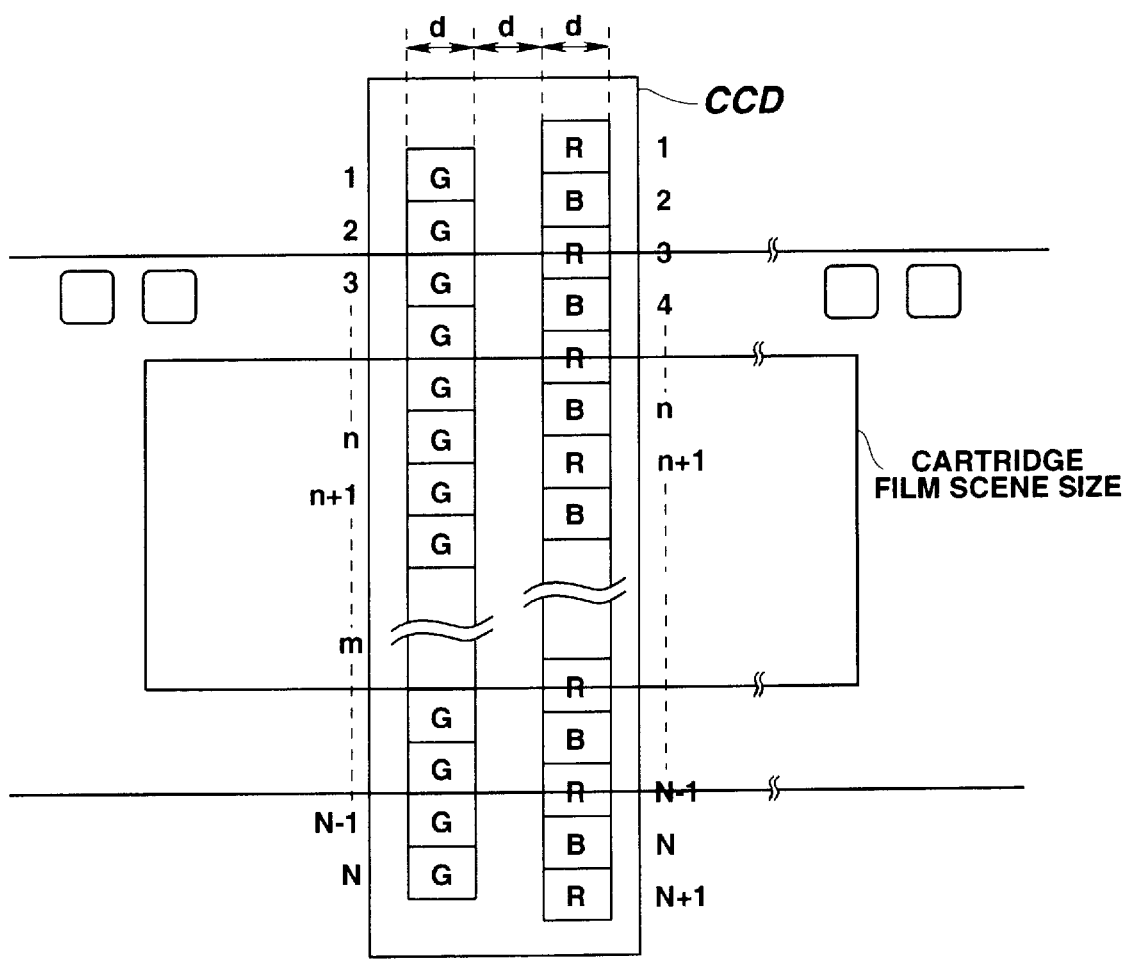
FIG. 3 is a simple illustration useful for describing a solid-state image pick-up device for taking pictures and a film scene to be picture-taken when a cartridge type film is mounted in the film scanner apparatus according to this embodiment.

An embodiment of the present invention will be described hereinbelow with reference to the drawings. FIG. 1 is a block diagram schematically showing an arrangement of a film scanner apparatus according to an embodiment of the present invention. Further, FIGS. 2 and 3 are simple explanatory illustrations of a solid-state image pick-up device for taking or extracting a picture and a film scene being an object of the picture extraction by the film scanner apparatus according to this embodiment, with FIG. 2 illustrating a state taken for when a JIS135 type film is loaded therein and FIG. 3 illustrating an state taken for when a cartridge type film (IX240 type film) with a size smaller in width than JIS135 type film is loaded therein.

As shown in FIG. 1 the film scanner apparatus according to this embodiment is composed of film scene size decision means 1 for making a decision on the size of a film scene being an object of the picture extraction, CCD effective pixel selection switching means 2 for selecting and switching an effective pixel of a solid-state image pick-up device (CCD) at every film scene size in accordance with the output of this film scene size decision means 1, and picture display means 3 for displaying a picture on the basis of an effective pixel picture selected through this CCD effective pixel selection switching means 2. Further, when the JIS135 type film is referred to as a first film while the cartridge type film is referred to as a second film, in the film scanner apparatus according to this embodiment, as shown in FIGS. 2 and 3 the projected magnification of the image pick-up optical system is designed such that the effective length of CCD>the vertical length of a scene of the first film>the vertical length of a scene of the second film.

The aforesaid film scene size decision means 1 makes a decision for distinguishing between the picture extraction from the first film size and the picture extraction from the second film, and on the basis of the decision result of the film size scene size decision means 1 the aforesaid CCD effective pixel selection switching means 2 automatically switches between the CCD effective pixels for the picture of the first film and the CCD effective pixels for the picture of the second film. In addition, the aforesaid picture displaying means 3 displays only a picture coming from the effective pixels. This arrangement allows the fixed magnification of the image pick-up lens, which can provide a film scanner apparatus having a relatively simple arrangement but capable of coping with films with a plurality of different scene sizes without increasing the size and complication of the apparatus. In addition, the extraction of a picture outside the picture area of the second film is avoidable so that the picture display becomes clear. Besides, it is possible to shorten the picture extraction time in the respective film sizes. Incidentally, in addition to the CCD type line sensor the aforesaid solid-state image pick-up device can be chosen from every line sensor such as a MOS type line sensor.

Figure 4:
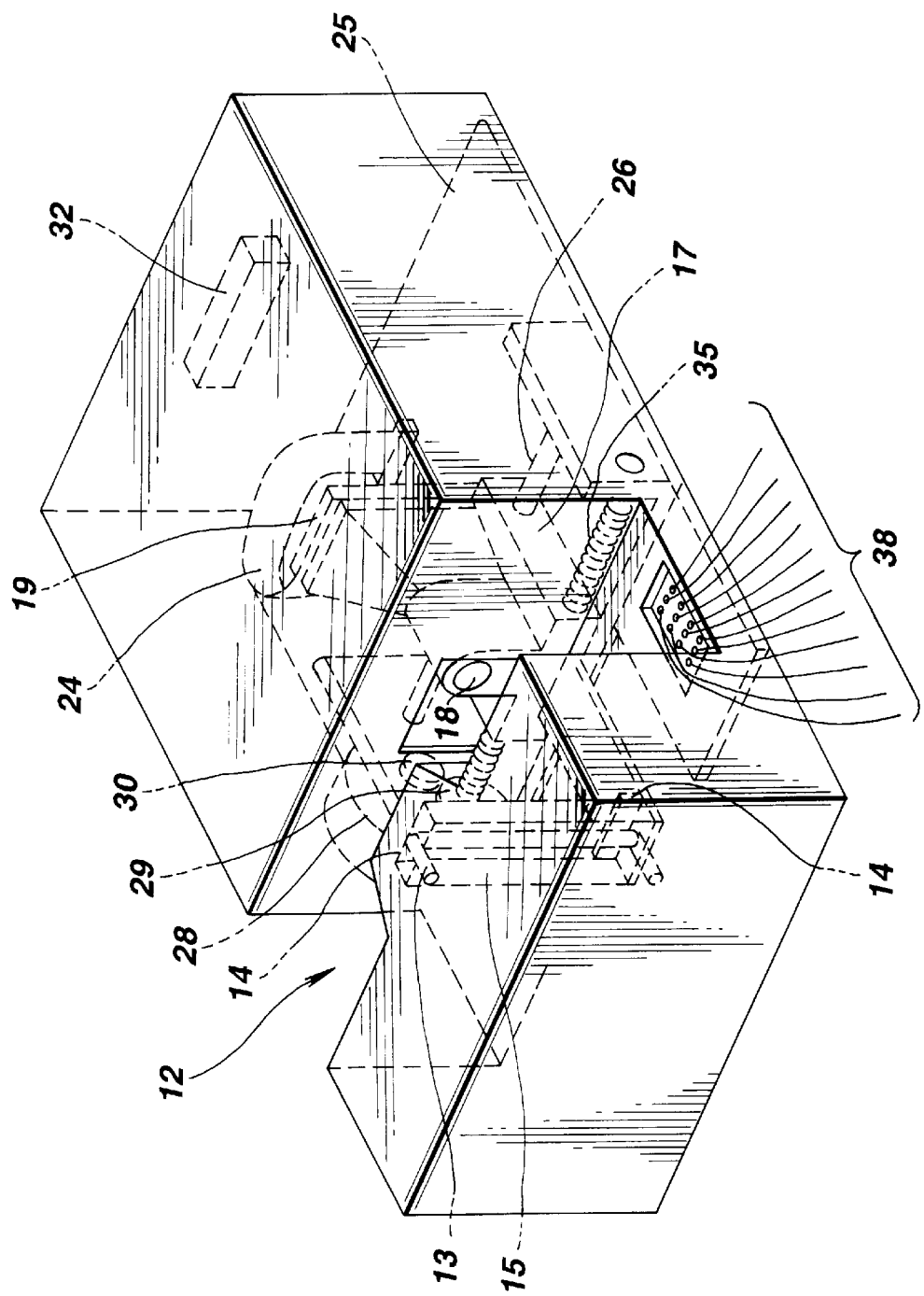
FIG. 4 is a perspective view showing an arrangement of a principal section of a film picture extraction unit of the film scanner apparatus according to this embodiment.

Secondly, a more detailed description will be taken hereinbelow of the film scanner apparatus according to this embodiment. FIG. 4 is a perspective view showing a structure of a principal portion of a film picture extraction unit of the film scanner apparatus according to this embodiment. As shown in the illustration, in an intermediate portion of the film picture extraction unit there is made a groove section 12 extending between a pair of side surfaces of the device. In this groove section 12, a projection is formed to protrude from a middle portion of a front side surface (in the illustration, the left and lower side surface) toward the interior of the groove section 12, thus making an approximately U-shaped configuration. The groove section 12 is designed to accept a first film holding device 100 (see FIG. 5) or a second film holding device 300 (see FIG. 6) which will be described later.

Furthermore, on the inner side of the projection there is vertically disposed a fluorescent lamp 13 which is for illuminating the film loaded. The fluorescent lamp 13 is bent to make a substantially U-shaped configuration in order to improve the space efficiency and is pressed through a fluorescent lamp holding member 14 against a reflector 15 with a V-groove portion to be held thereon. Moreover, the fluorescent lamp 13 passes groove section 12 receiving the film holding device 100 or 300 and is attached to a lens CCD holding member 17 so that it is movable together with the lens CCD holding member 17. In a plane facing the fluorescent lamp 13 there is placed a lens 18 held on the aforesaid lens CCD holding member 17. This lens 18 is for the image formation of a film picture illuminated on a linear CCD 19. Further, the output of the linear CCD 19 is coupled through a flexible printed board 24 to a main substrate 25. The main substrate 25 is situated on a bottom portion of the film picture extraction unit.

The aforesaid lens CCD holding member 17 is movably held by a screw shaft 35 and a guide shaft 26 which are parallel to each other. This screw shaft 35 has a spiral groove with which the lens CCD holding member 17 engages. Accordingly, through the rotation of the screw shaft 35, the lens CCD holding member 17, together with the fluorescent lamp 13, the lens 18 and the linear CCD 19, is movable in parallel to the axial directions of the shaft for the subscanning in a state with being kept in positional relationship with them. The screw shaft 35 is connected through gears 29, 30 to a stepping motor 28 to receive the rotational force of the stepping motor 28.

The start and end positions of the lens CCD holding member 17 are detected by an optical sensor (not shown), with the absolute position of the lens CCD holding member 17 being detectable on the basis of a reference position and the number of drive pulses for the stepping motor 28. Thus, it is possible to prevent the lens CCD holding member 17 from colliding against a wall surface or the like. Further, storage means which will be described later stores positions on a film scene corresponding to the number of stepping drive pulses from the reference position, which in turn, is used for the timings of the extraction of the film scene data or for the timings of the data transfer to a personal computer or the like which serves as a picture display means. In general the data in this storage means is the special information for the film holding device, and hence the storage means is located within the film holding device.

On the rear end surface (in the illustration, the right and upper side) of the film picture extraction unit there is disposed a cable connector 32 for connecting the film picture extraction unit to a personal computer (not shown) or the like, thus allowing the connection through a lead wire (not shown) or the like to the main substrate 25. In addition, on one end portion of the main substrate 25 there are provided a group of contacts 38 for electrical connection between the film picture extraction unit according to this embodiment and the 135 film holding device 100 or the cartridge film holding device 300. The electrical connection is accomplished when the 135 film holding device 100 or the cartridge film holding device 300 is mounted therein. The group of contacts 38 are set as follows.

Figure 5:
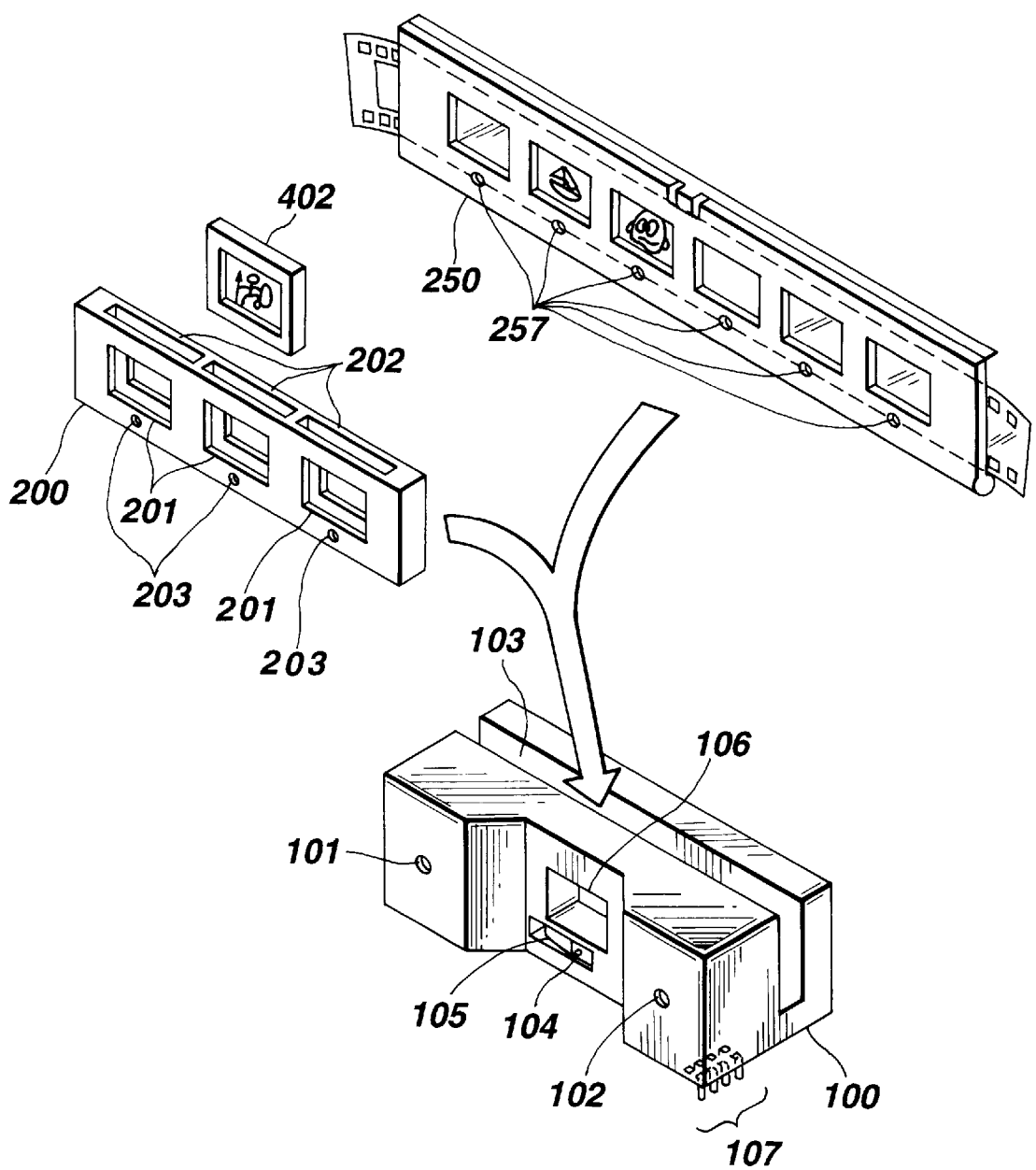
FIG. 5 is an external perspective view showing a 135 film holding device mountable in a film picture extraction unit, a slidefilm carrier for holding a slidefilm engaged with the film holding device and a stripfilm carrier for holding a stripfilm engaged with the same film holding device.

- 38$a$, 38$b$ . . . 2-bit signal for decision on the kind of film holding device (each bit capable of being at a high (H) or low (L) state)
  - HL . . . cartridge type film holding device 300
  - LH . . . JIS135 type film holding device 100
  - LL . . . no mounting of film holding device
- 38$c$ . . . power supply line
- 38$d$ . . . GND line
- 38$e$, 38$f$ . . . 2-bit signal for control of film drive motor
  - HL . . . normal rotation
  - LH . . . reverse rotation
  - HH . . . braking
  - LL . . . off condition
- 38$g$ . . . LED power supply line for PI/PR
- 38$h$ . . . PI output line
- 38$i$ . . . PR1 output line
- 38$j$ . . . PR2 output line
- 38$k$ . . . magnetic information output line
- 38$l$ . . . switch output line Furthermore, a description will be taken hereinbelow of the aforesaid first film holding device 100 and the aforesaid second film holding device 300 which are mountable in the film picture extraction unit according to this embodiment. First, the description will begin with the first film holding device 100 for the JIS135 type film. FIG. 5 is an external perspective view showing the aforesaid film holding device 100 mountable in the film picture extraction unit, a slidefilm carrier 200 for holding a slidefilm 402 and engaging with the first film holding device 100 and a stripfilm carrier 250 for holding a stripfilm and engaging with the same first film holding device 100 in the film scanner apparatus according to this embodiment. As described before, in the film picture extraction unit, the 135 film holding device 100 is mountable in the groove section 12 (see FIG. 4). That is, the 135 film holding device 100 has a configuration substantially equal in size and shape to that of the groove section 12 so that it is mountable to engage therewith.

The 135 film holding device 100 is made to accommodate the aforesaid JIS135 type film and has hole portions 101, 102 in both side portions of the front side surface (in the illustration, the left lower side), whereby positioning points (not shown) planted on the film picture extraction unit side are respectively fitted in the hole portions 101, 102 when the 135 film holding device 100 is set in the groove section 12, so that the 135 film holding device 100 is positioned in a plane perpendicular to the optical axis. At a portion of the bottom surface of the 135 film holding device 100 which faces a group of electric contacts 38 of the film picture extraction unit when being mounted in the groove section 12, there is provided a metallic pin 107 receiving a biasing force due to a leaf spring brought into contact with the group of contacts. In addition, in the 135 film holding device, there is provided a slit 103 for accepting the slidefilm carrier 200 or the strip film carrier 250. Moreover, the slidefilm carrier 200 has mounting sections 202 for mounting slide films 402. Further, an opening portion 106 for illumination is made in the central recess section of the 135 film holding device 100, while pin 104 for positioning the carrier is supported by a leaf spring 105 under the opening portion 106 so that it can advance and retreat. Still further, hole portions 203, 257 made in lower portions of the slidefilm carrier 200 and the stripfilm carrier 250 are hole portions which engage with the positioning pin 104, thereby positioning the carriers 200, 250.

Figure 6:
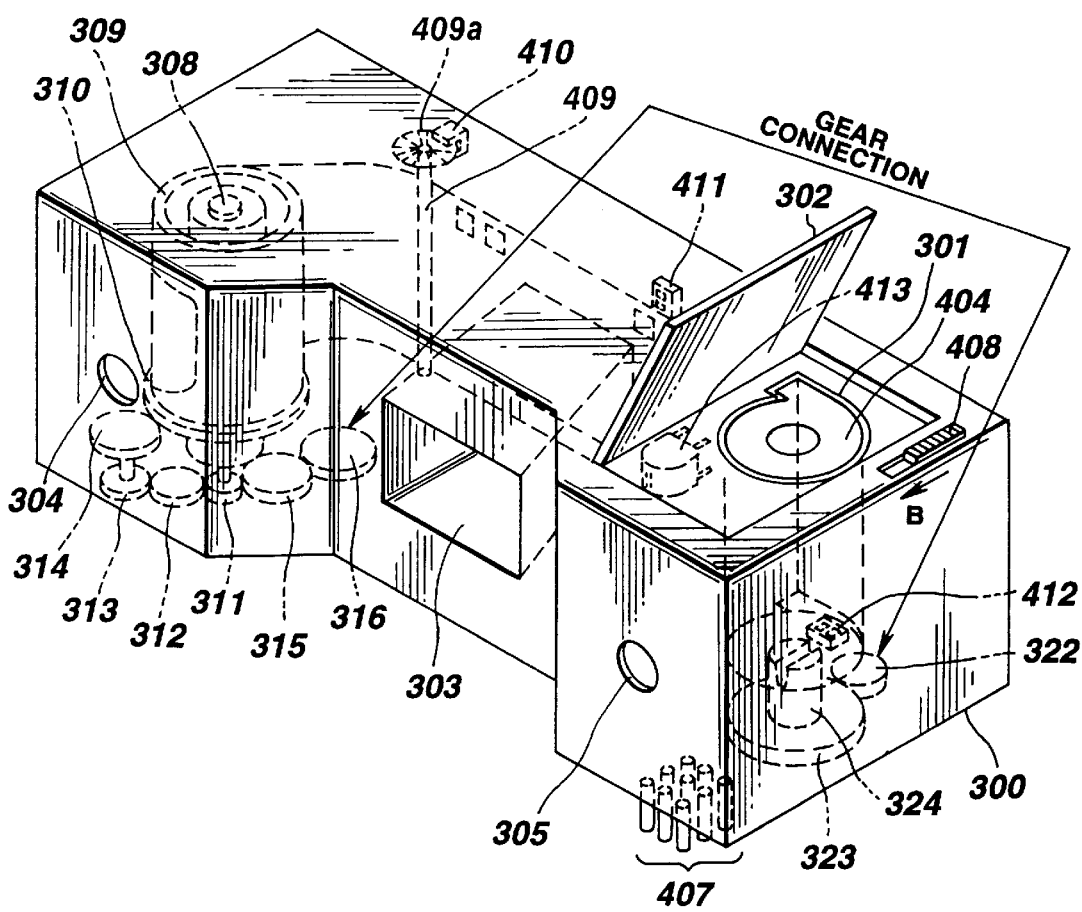
FIG. 6 is an external perspective view showing a cartridge film holding device mountable on the film picture extraction unit in the film scanner apparatus according to this embodiment.

Still further, a description will be made hereinbelow of the second film holding device 300 which can accept the cartridge type film. FIG. 6 is an outside perspective view showing the second film holding device 300 mountable in the aforesaid film picture extraction unit in the film scanner apparatus according to this embodiment. As shown in the illustration, the cartridge film holding device 300 is made to be mountable in the groove section 12 (see FIG. 4) of the film picture extraction unit according to this embodiment as described before. More specifically, this cartridge film holding device 300 has a configuration substantially equal in size and shape to that of the groove section 12, so that it can be fitted and mounted in the groove section 2.

This cartridge film holding device 300 covers a cartridge type film 404 and has, at its one side, a cartridge film compartment 301 for housing the cartridge film 404 and has a cartridge compartment cover 302 at an upper portion of the cartridge film compartment 301. In addition, in the vicinity of an opening portion of the cartridge film compartment 301, there is located a slide switch 408 for inhibiting the opening of the cartridge compartment cover 302. When in the closed condition, the cartridge compartment cover 302 is commonly inhibited to open, while it comes into an opened condition in a manner that the slide switch 408 is operated to move in a direction indicated by an arrow B in the illustration. Further, if the user closes the cartridge compartment cover 302, through a stopping mechanism (not shown), the cartridge compartment cover 302 assumes the opening inhibited condition.

The aforesaid cartridge film holding device 300 incorporates a switching member (not shown) linked with the slide switch 408, so that the switch turns on and off in accordance with the opening and closure of the cartridge compartment cover 302. Accordingly, the closure of the cartridge compartment cover 302 by the user causes the automatic loading operation, whereas the opening of the same cover 302 by the user leads to the rewinding operation. Further, an opening portion 303 for illumination is made in a central recess portion of the cartridge film holding device 300, whereby a scene corresponding to the cartridge film 404 supplied to the rear surface (in the illustration, the right and upper side) of the same opening portion 303 is taken by the film picture extraction unit. Still further, hole portions 304, 305 are made in both side portions of the front surface (in the illustration, the left and lower side) of the cartridge film holding device 300 so that, when the cartridge film holding device 300 is set in the groove section 12, positioning pins (not shown) planted in the film picture extraction unit side respectively engage with the hole portions 304, 305 to position the cartridge film holding device 300 in a plane perpendicular to the optical axis.

Moreover, at a portion of the bottom surface of the cartridge film holding device 300 which faces the group of electric contacts 38 in the film picture extraction unit side when being set in the groove section 12, there is disposed a group of metallic contacts 407 which receive a biasing force due to a leaf spring coming into contact with the group of contacts 38. Through the group of contacts 407, the cartridge film holding device 300 receives the power for the cartridge film holding device 300 and a film drive control signal from the film picture extraction unit. On the other hand, the cartridge film holding device 300 gives film drive quantity information, film information, film cartridge information, in-cartridge EEPROM information, information on various switches placed in the cartridge, and others to the film picture extraction unit.

Moreover, on the other side of the cartridge film holding device 300, there is disposed a film take-up spool 309 for winding a film pulled out from the cartridge film 404, and inside of this film take-up spool 309 there is placed a motor 308 for winding and rewinding the film. Under the spool 309 there is located a gear 310 which rotates integrally with the spool 309, whereby owing to a pinion gear 311 fixed to an output shaft of the motor 308 the rotational force of the motor 308 is transferred through gears 312, 313 and 314 to the gear 310.

On the other hand, below the cartridge film compartment 301, a film supply fork 324 for the cartridge film 404 is disposed integrally with a gear 323. This fork 324 is made to engage with a spool (not shown) within the cartridge in response to the load of the cartridge film 404. In addition, a gear 322 engages the gear 323 rotating together with the fork 324 and is connected through a train of gears (not shown) and gears 316, 315 to a pinion gear 311 of the motor 308. The film fed from the cartridge film 404 is taken up around the spool 309, while a film driven roller 409 for detecting the driven amount of the film is placed in this film feed passage and rotates in accordance with the travelling of the film.

On one end portion of the film driven roller 409, there is placed a photointerrupter gear 409a having fine slits extending in the radial direction. Further, a photointerrupter 410 is disposed to interpose the rotating surface of the photointerrupter gear 409. In accordance with the travelling of the film fed from the cartridge film 404, the photointerrupter gear 409 repeatedly light blocks and unblocks transmission to the photointerrupter 410. Whereupon, the travelling quantity of the film is detectable by counting output waveform pulses from the photointerrupter 410. Still further, on the rear side facing the film supply passage, there is disposed a film perforation detection photoreflector 411 for detecting the driven amount of the film, whereby the reference for the scene position of the film is detectable. Moreover, on a lower portion of the cartridge film compartment 301 there is situated a film cartridge information detection photoreflector 412 for detecting various information on the loaded cartridge film 404. In addition, on an upper portion of the cartridge film compartment 301 there is placed a magnetic head 413 for detecting magnetic information on the loaded cartridge film 404. The film magnetic information includes the aspect ratio, information on photographing date and others. The motor 308 and the respective sensor groups are connected through a flexible printed board (not shown) to the group of contacts 407.

Figure 7:
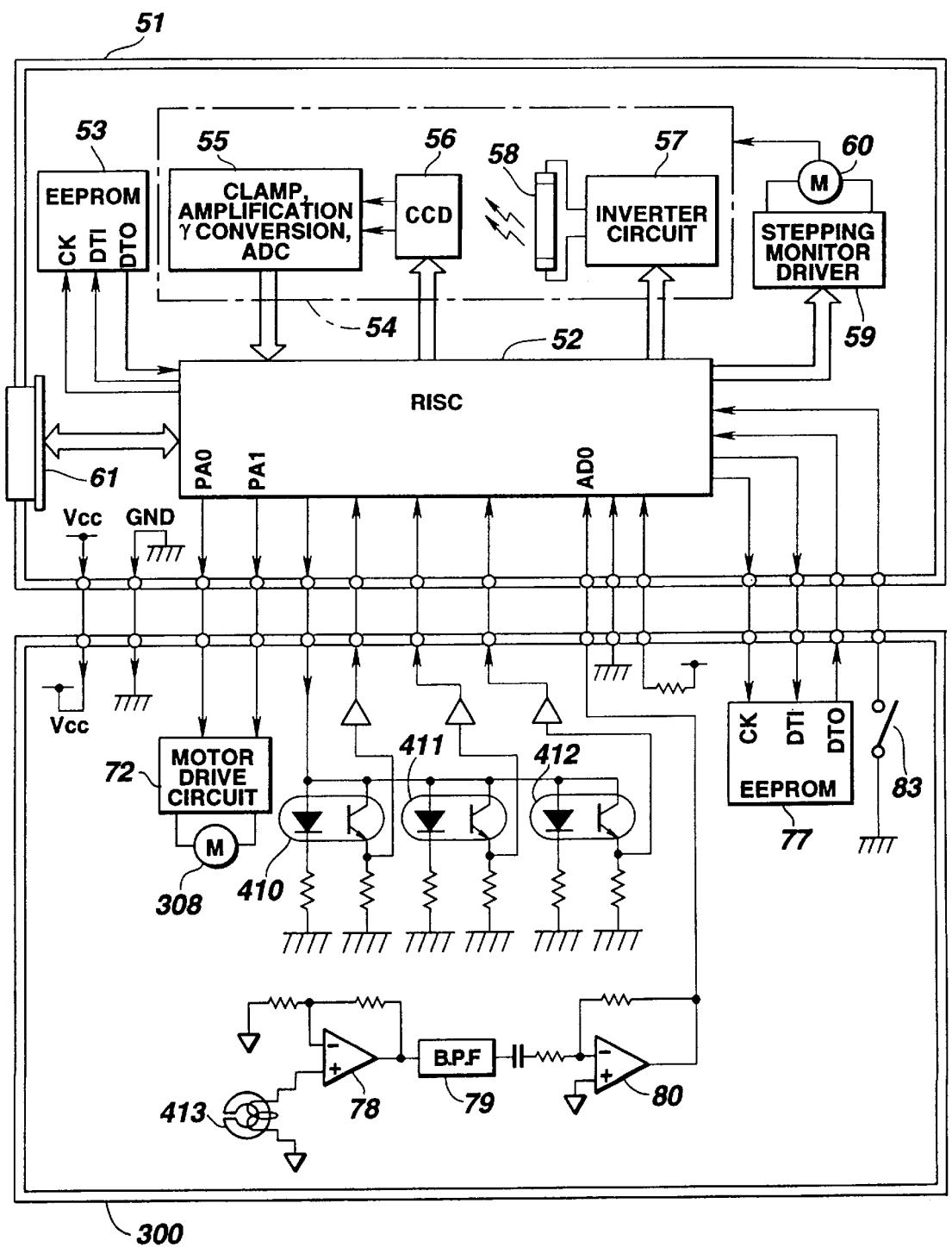
FIG. 7 is an electric circuit diagram showing internal circuits of the film picture extraction unit and the cartridge film holding device in the film scanner apparatus according to this embodiment.

FIG. 7 is an electric circuit diagram showing an internal circuit of the film picture extraction unit and the cartridge film holding device in this embodiment. As shown in the illustration, in the film picture extraction unit 51 side, for control, a RISC 52 is coupled to a picture processing circuit block 54 including an inverter circuit 57 for lighting a fluorescent lamp 58 and further for controlling the quantity of light thereof, a solid-state image pick-up device (CCD) 56 for converting a film picture into an electric signal and a circuit 55 comprising a clamp circuit, an amplifier, a gamma conversion circuit, an A/D converter and others, a stepping motor 60 for step-driving the picture processing circuit block 54, a stepping motor driver 59, and others. In addition, an EEPROM 53 for storing inherent information on the film picture extraction unit is coupled to the RISC 52, and a data communication connector 61 to a picture display means such as a personal computer is connected thereto without putting a communication dedicated IC therebetween. That is, the data communications with the personal computer or the like are obtained through communication software within the RISC 52.

If executing the control of the above-mentioned circuits and others with softwares in a single controller, higher-speed processing is required because each of the readout sequence in the CCD 56, the control sequence in the picture processing circuit 54, the driving sequence for the stepping motor 60 and the data communication sequence to the personal computer or the like is required to be conducted at an extremely high speed and the times for conducting the plurality of sequences are overlapped with each other, and therefore difficulty is encountered to conduct these sequences with softwares through the use of the prior CPU. The film scanner apparatus according to this embodiment is designed in view of these situations, and employs, as a processing and controlling microcomputer, a RISC (Reduced Instruction Set Computer) type controller in place of the prior CISC (Complexed Instruction Set Computer) so as to perform the processing relying on a single controller.

The CISC takes the time corresponding to 4 clocks for the execution of one command, while the RISC can conduct the same command in the time corresponding to one clock, which is four times the high-speed processing of the CISC. Accordingly, during the waiting time for each of signal control processing, for example, if the CISC achieves 30-step signal arithmetic processing, the RISC can accomplish 120-step signal arithmetic processing during the time period required by the CISC. For this reason, higher and more complicated signal operations and control processing become possible, thus improving the S/N ratio and executing more complicated sequence control through the use of softwares.

On the other hand, the cartridge film holding device 300 is composed of a starting switch 83 for the cartridge film holding device 300, a magnetic reproducing circuit block comprising the aforesaid magnetic head 413, amplification sections 78, 80, a band pass filter 79 and others, an EEPROM 77, a PI/PR detection circuit block comprising the aforesaid photointerrupter 410, the aforesaid photoreflectors 411, 412 and others, a motor drive circuit block comprising the aforementioned motor 308 and a motor drive circuit, and other circuits, with these circuit blocks being located to be connectable to the RISC 52. The EEPROM 77 stores a cartridge film 404 rewinding end indicating flag, the number of winding frames of the film and inherent information such as focusing regulating values on the film holding device.

Furthermore, as described above, of the PI/PR detection circuit block, the output pulse of the photointerrupter 410 is indicative of the film travelling amount, while the output pulse of the photoreflector 411 is used for the detection of the perforation of the film, and even the output pulse of the photoreflector 412 is used for the detection of an information code on a film cartridge written in the film disk of the cartridge film 404. Moreover, when the cartridge film holding device 300 is set in the film picture extraction unit, the reproduction output of the magnetic reproducing circuit block, the signal outputs of the photointerrupter 410 and the photoreflectors 411, 412 in the PI/PR detection circuit block, and an LED lighting control terminal, a data communication terminal of the EEPROM 77, a control terminal in the film drive motor drive circuit block, an output terminal of the starting switch 83 and a power/GND input terminal are respectively connected through corresponding connection terminals to the aforesaid RISC 52 provided within the film picture extraction unit. Since the outputs of the photointerrupter 410 and the photoreflectors 411, 412 are weak in noises, the outputs are made through buffers.

Thus, the aforesaid cartridge film holding device 300 is in connection with the RISC 52 serving as a control means within the film picture extraction unit, and the respective functional blocks of the cartridge film holding device 300 and the film picture extraction unit are unification-managed under the control of the RISC 52. With this arrangement, it is possible to cut down the number of parts for the film holding device and hence to reduce the mounting area and the manufacturing cost and further to make it more compact, and it is even possible to simplify the software owing to the unification of the respective timing managements so that the reliability increase.

Figure 8:
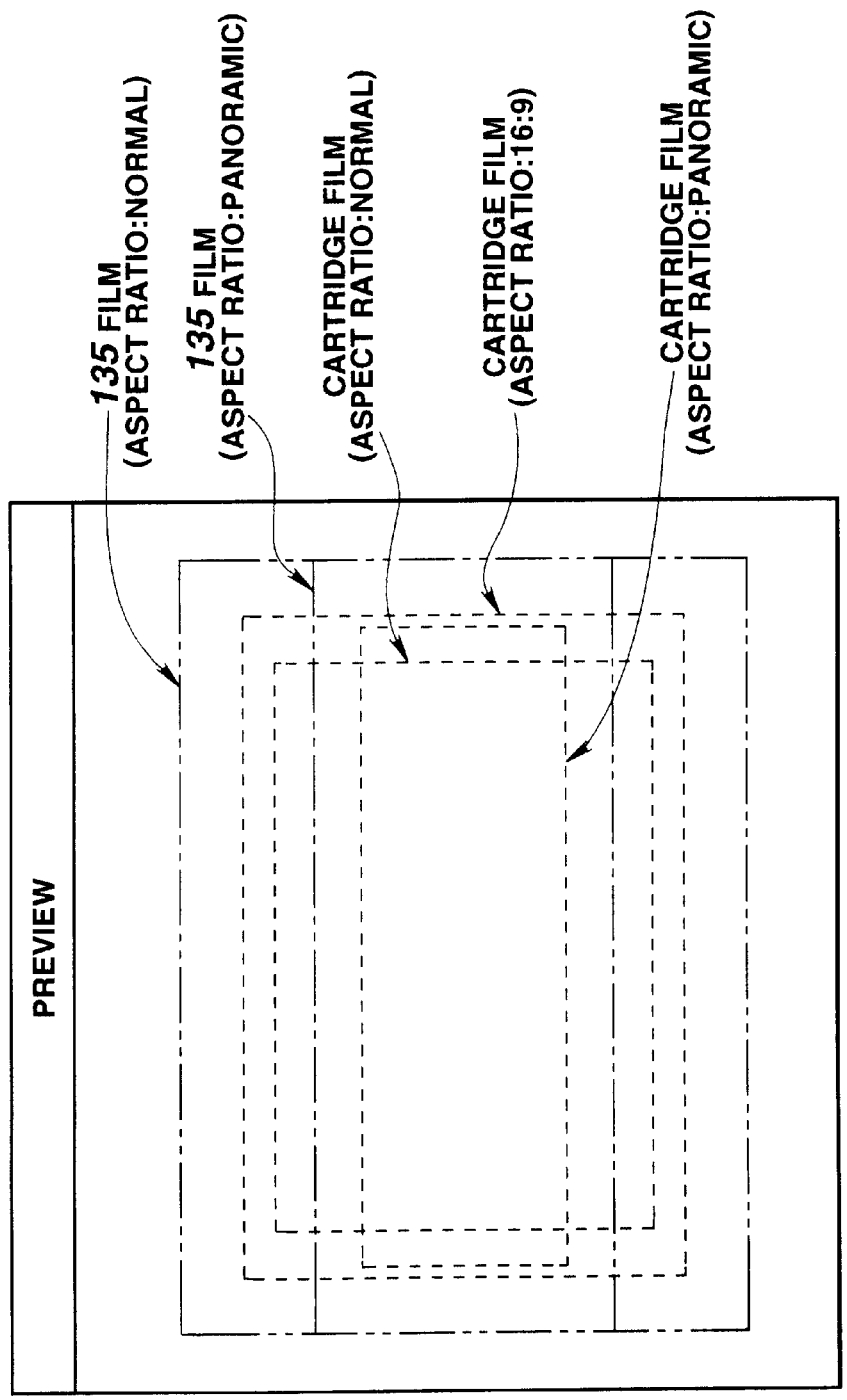
FIG. 8 is a front elevational view showing one example of display modes of the film scanner apparatus according to this embodiment.

FIG. 8 is a front elevational view showing one example of display modes of the film scanner apparatus according to this embodiment. In this case, although the example relates to a preview window, this embodiment is not limited to this display but also covering a thumb nail display window and a main scan display window. First, in the film scanner apparatus according to this embodiment, in terms of the JIS135 type film, as shown in FIG. 2 the pixels from the second pixel to the Nth pixel in a CCD are given as the pixels of the effective picture. On the other hand, in terms of the cartridge type film, as shown in FIG. 3 the pixels from the pth pixels to mth pixels are given as the pixels of the effective picture. FIG. 8 shows an example in which the above-mentioned pixels are directly displayed on a picture display means such as a personal computer.

The selection of the aforesaid effective pixels is determined in such a manner that the aforesaid RISC 52 (see FIG. 7) detects adaptor identification means as shown in FIGS. 5 and 6. As this adaptor identification means, various methods can be taken, for example, a way of mere detection of a bit code due to the occurrence or no occurrence of an electrical connection between the adaptor and the film scanner apparatus body, a way of optical readout of a bit code based upon the difference of the reflectance and the transmittance, and a way of readout of a bit code written in a storage element such as an EEPROM. It is also possible to merely use analog data such as a resistance value and a voltage value. Further, the decision of the film scene size is not particularly limited to the above description but can depend upon various methods, for example, ways relying on the presence or absence of film magnetic data, the occurrence or no occurrence of the detection of a cartridge and the detection of an identifier of a film holder.

Furthermore, a preview scene is displayed with pixels of approximately 130×200, and hence the pixels in the effective scene are reduced or thinned to agree with the sampling of this number of pixels, thus attaining the data. FIG. 8 illustrates an example of a uniform pixel reduction in the case of the 135 type film and in the case of the cartridge type film. According to such a display, the user can instantaneously judge whether the target scene is of the 135 type film or of the cartridge type film, which is extremely convenient in use. Particularly, this is more effective in cases where the 135 type film adaptor and the cartridge type film adaptor have configurations similar to each other and in cases where the respective adaptors are simultaneously mountable, that is, if the film scanner apparatus can concurrently accept both the 135 film and cartridge film. Besides, it is very effective because even at retrieval it is possible to instantaneously decide the film producing that picture.

Figure 9:
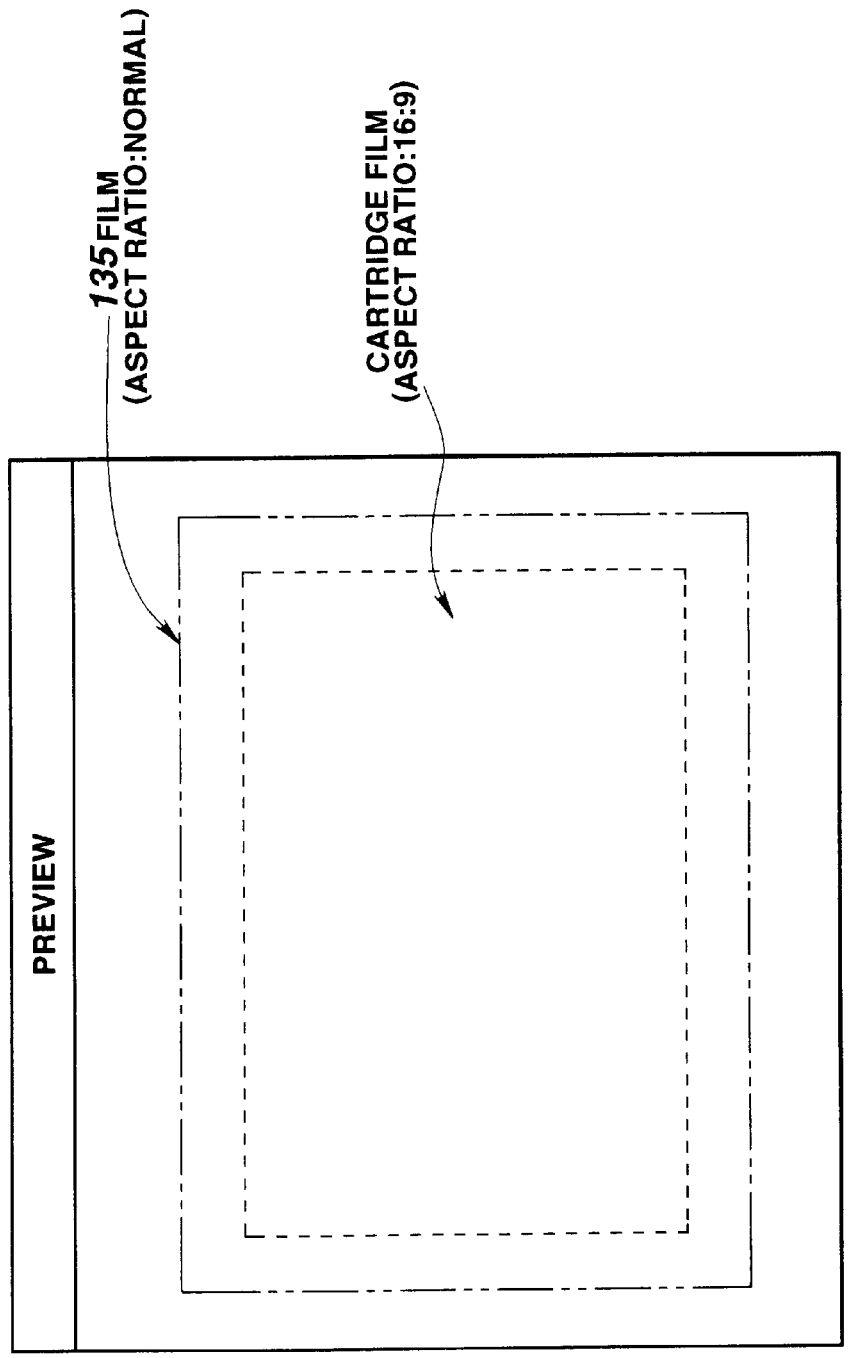
FIG. 9 is a front elevational view showing another example of display modes of the film scanner apparatus according to this embodiment.

FIG. 9 is a front elevational view showing a display example in which a picture is displayed in as a large scale as possible taking how to use into consideration. Thus, for obtaining the data the reduction rate of the pixels in the effective scene is changed at every film scene size. More specifically, the number of picture data to be taken is substantially equalized as follows.

(first reduction rate/second reduction rate)=(first film scene size/second film scene size)

To determine the number of picture data to be taken, interpolation processing is also acceptable but takes a little longer time.

Figure 10:
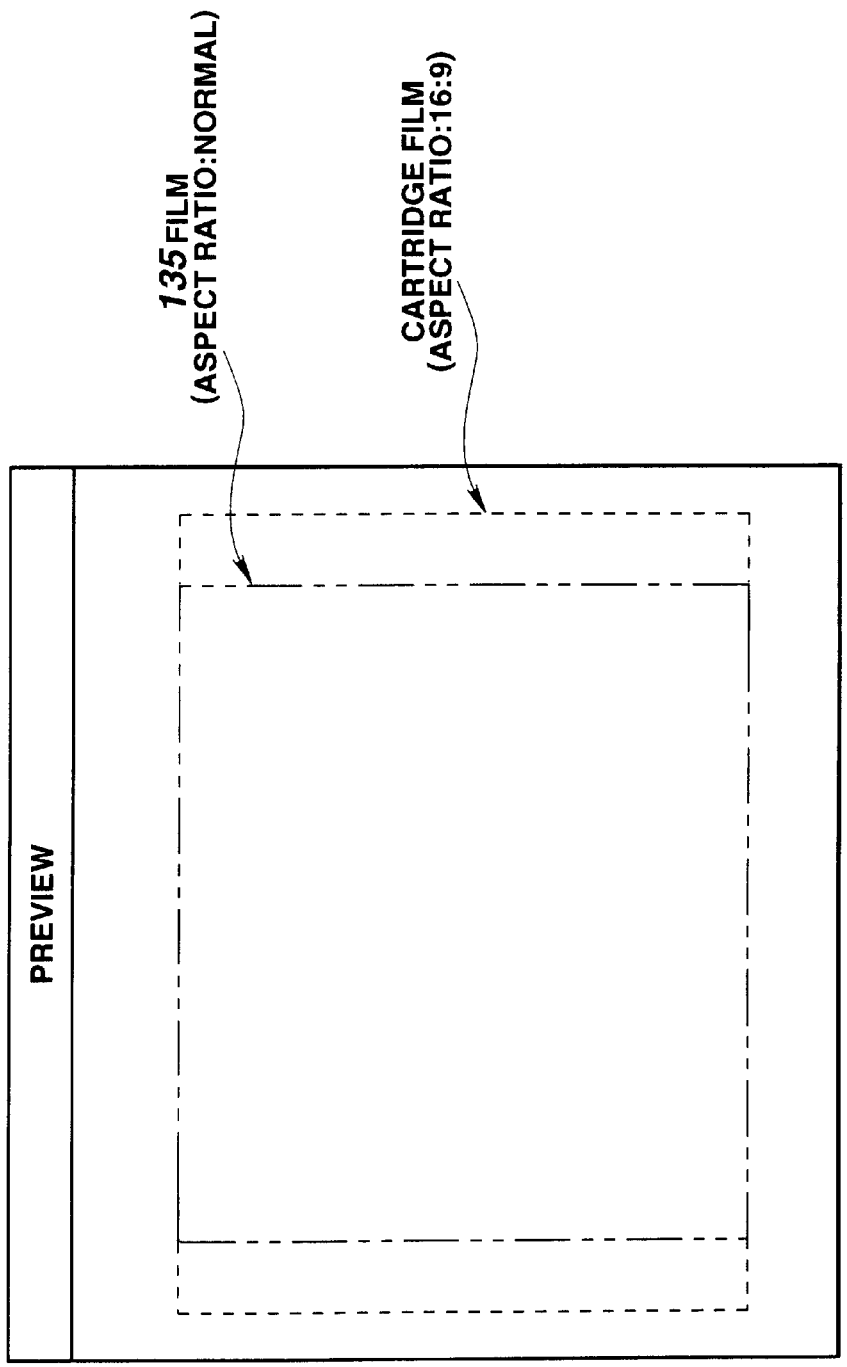
FIG. 10 is a front elevational view showing a further example of display modes of the film scanner apparatus according to this embodiment.

FIG. 9 is an illustration of a display example in which both film scenes coincide with each other in the horizontal directions, while FIG. 10 is an illustration of a display example in which both film scenes coincide with each other in the vertical directions. Accordingly, the operating characteristics of the preview scenes can be maintained constant at every film, and in the case of this display example, the scene of the 135 film is normally displayed and, if it is a film cartridge, the size of the aspect ratio (16:9) is displayed, that is, the display is made with different aspects, with the result that it is possible to decide which film provided the target picture, as initially intended.

Figure 11:
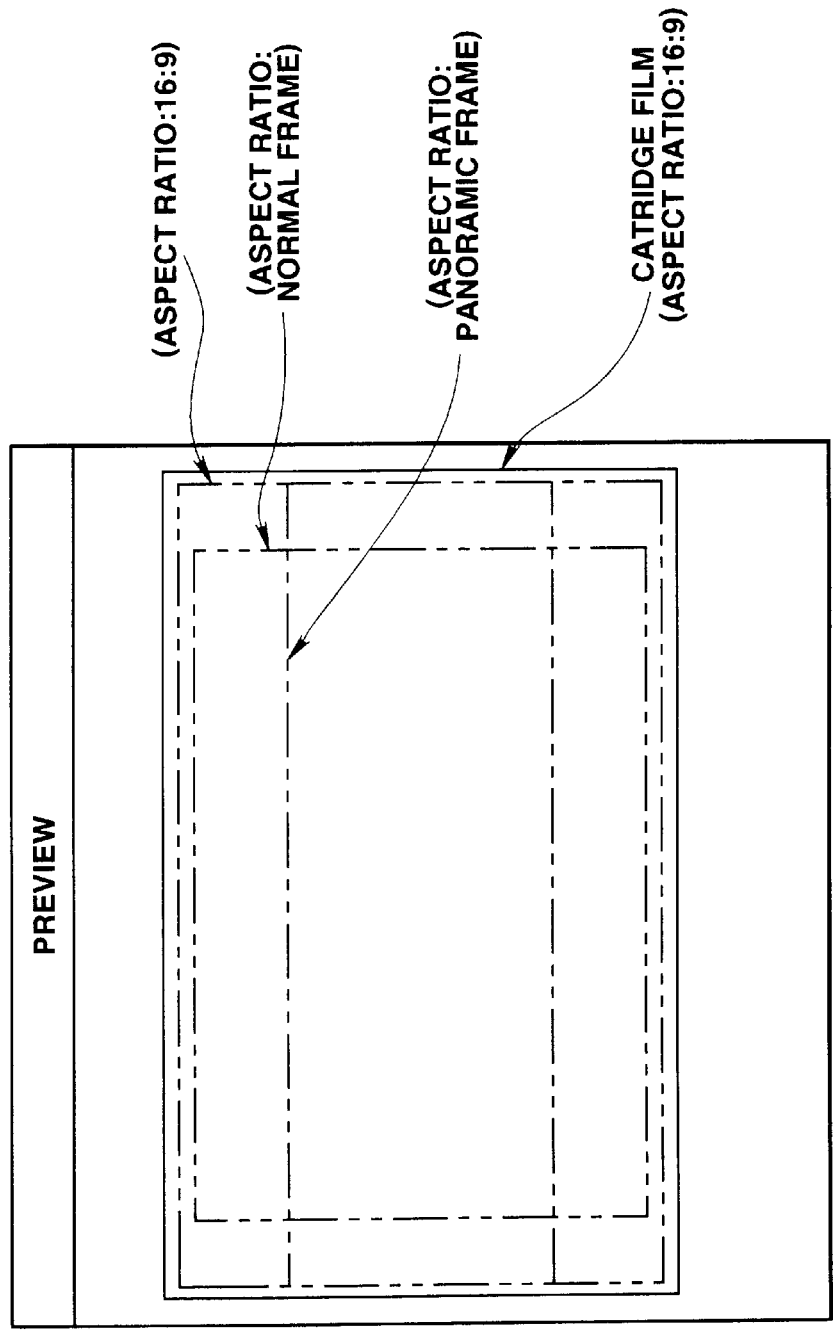
FIG. 11 is a front elevational view showing a further example of display modes of the film scanner apparatus according to this embodiment.

In the case that the film scenes are made to be vertically or horizontally coincident with each other, a problem arises in that difficulty is encountered to distinguish therebetween if the aspect ratios are the same. That is, since the normal size of the 135 film and the normal size of the cartridge film are equal in aspect ratio to each other, although the scene sizes differ from each other, only the aspect ratios are the same and hence, when at the picture display the scenes are displayed to vertically or horizontally coincide with each other, it is difficult to distinguish therebetween. For solving this problem on the scene display, only the frame is over-written for the aspect display, whereas the picture itself is displayed with an aspect ratio different between the 135 film and the cartridge film. That is, in the case of the cartridge film, the picture data of all the film scenes are read out and displayed within a frame indicated by a solid line in FIG. 11, and any one of the frames of the normal size, 16:9 size and the panoramic size recorded in a magnetic recording medium or the like are displayed. Incidentally, naturally the picture field is within the aspect frame.

Figure 12:
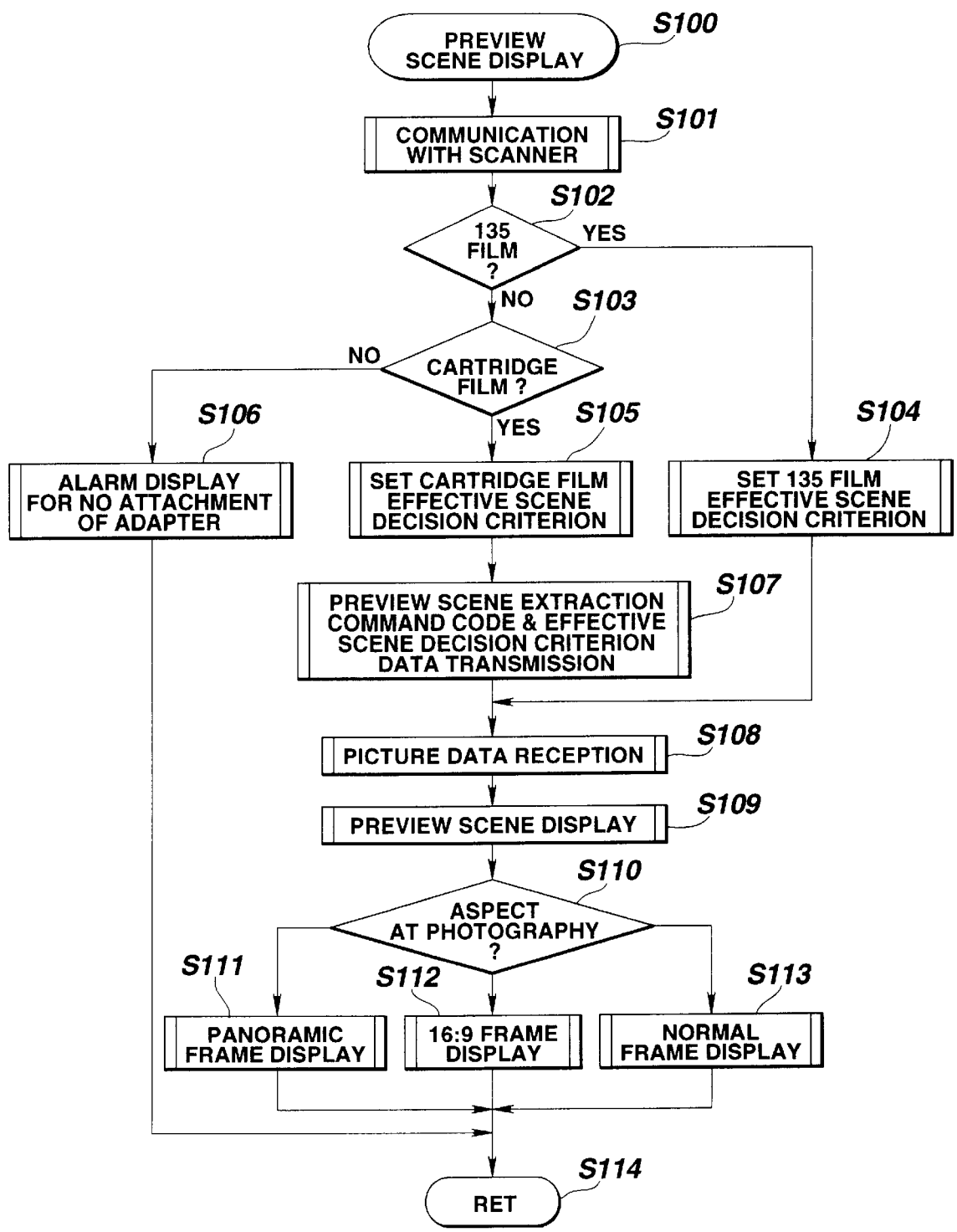
FIG. 12 is a flow chart useful for describing an operation of a personal computer side conducted when a personal computer serving as a picture displaying means displays a preview scene on the basis of a film picture read out through the film picture extraction unit in the film scanner apparatus according to this embodiment.

Still further, referring to flow charts, a description will be made hereinbelow of a picture display operation of the film scanner apparatus according to this embodiment. FIG. 12 is a flow chart showing an operation in the personal computer side when the personal computer being a picture display means makes a preview scene display of a film picture read out through the film picture extraction unit in the film scanner apparatus according to this embodiment. First of all, in response to depressing a preview button in a monitor scene on the personal computer (PC), at a step S100 the preview scene display processing starts. At a step S101 the personal computer makes communication with the film picture extraction unit being the film scanner apparatus body to obtain a code for an adaptor identifier previously detected by the CPU (RISC 52) in the film picture extraction unit side. Further, at a step S102, on the basis of the adaptor code, it checks whether or not the scene being an object of the preview is a scene of the 135 film. If being the adaptor for the 135 film, the operation advances to a step S104 to set the reference data for the decision on the 135 film effective scene. If different therefrom, the operation proceeds to a step S103 to check whether or not the scene for the preview is the cartridge film scene. In this case, if being the cartridge film adaptor, a step S105 follows to set the reference data for the decision on the cartridge film effective scene. If not, the operation goes to a step S106. At the step S106 an alarm display representative of no mounting of the adaptor is made in the monitor scene on the personal computer, then followed by a step S114 at which the operational flow returns.

Furthermore, at a step S107 a preview scene extraction command and an effective scene decision reference data at that time are transmitted to the film picture extraction unit. In this case, the effective scene decision reference data is expressed with the number of drive pulses for the stepping motor corresponding to the scene left and right edge positions in the subscanning direction, the pixels numbers of the CCD corresponding to the scene upper and lower edges in the main scanning direction, and the number of reduced pixels (the number of clock pulses, because the pixel number corresponds to the clock) signifying how often the pixels are derived. At a step S108 the personal computer receives the picture data from the scanner corresponding to the command in the step S107. Then, at a step S109 the personal computer displays the picture data, obtained in the step S108, on its own monitor through the use of the obtained number of pixels. Moreover, at a step S110 the personal computer decides, on the basis of the film frame (magnetic) information obtained through the communication with the film picture extraction unit in the step S101, whether the aspect ratio at the photography of the target film frame corresponds to the panoramic size, 16:9 size or the normal size. If it is the panoramic size, the operation advances to a step S111 to display the panoramic frame. On the other hand, if being the 16:9 size, the operation goes to a step S112 to display the 16:9 frame. Further, if being the normal size, the operation proceeds to a step S113 to make the normal frame display. Thereafter, the operational flow returns at a step S114.

Figure 13:
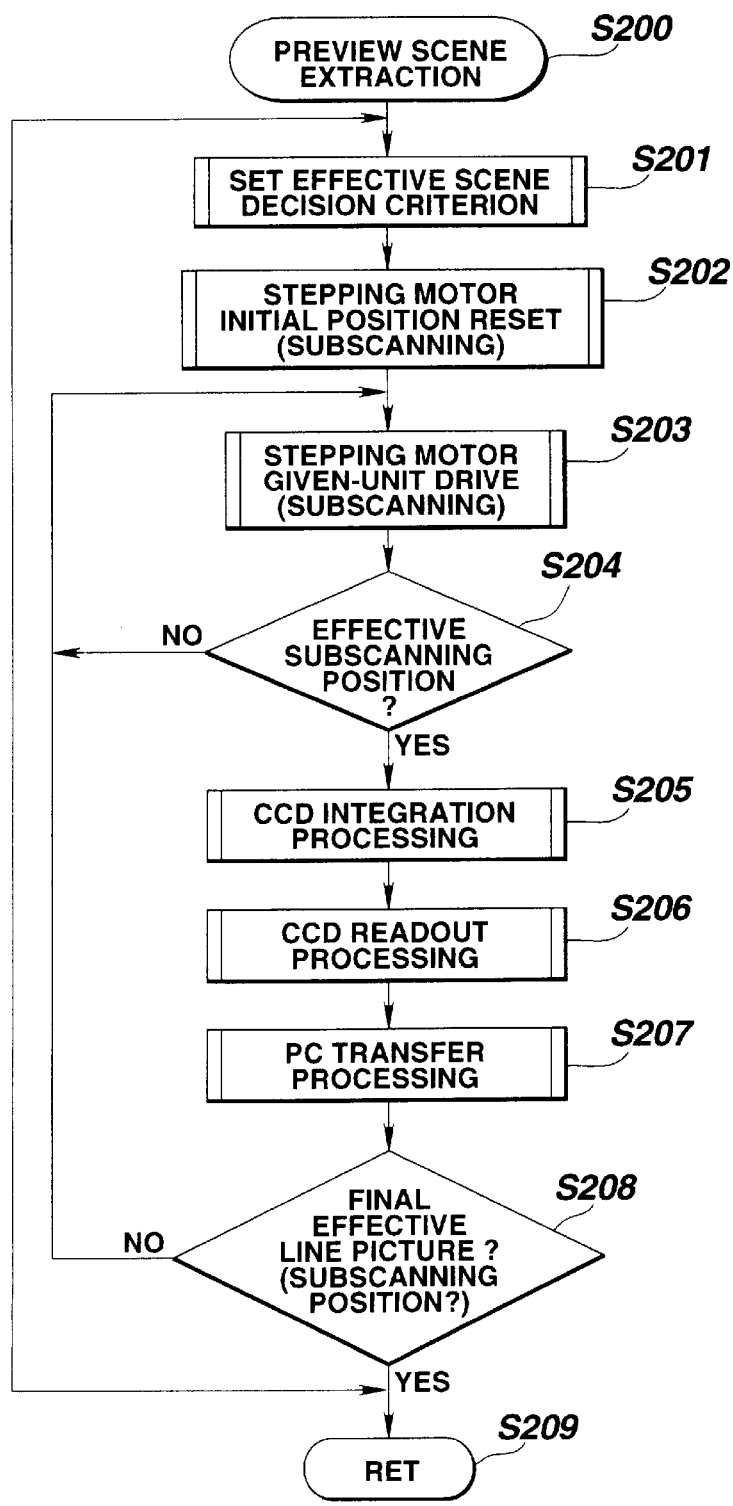
FIG. 13 is a flow chart provided for explaining an operation of the film picture extraction unit corresponding to a preview scene readout command from the personal computer in the film scanner apparatus according to this embodiment.

FIG. 13 is a flow chart showing an operation of the film picture extraction unit corresponding to the preview scene readout command from the personal computer in the film scanner apparatus according to this embodiment. First of all, at a step S200 the RISC 52 of the film picture extraction unit receives a preview scene readout command from the personal computer and starts the preview scene extraction processing. At a step S201 a RAM of the RISC 52 stores the effective scene decision reference value and the subscanning drive quantity (the number of unit steps) on the basis of the data fed from the personal computer. Subsequently, at a step S202 the stepping motor is returned to the initial position for the subscanning, followed by a step S203 in which the stepping motor is driven by a given unit quantity, and the number of drive steps from the initial position is counted. Thereafter, the operation advances to a step S204 to decide, on the basis of the above-mentioned number of drive steps, whether or not it is an effective subscanning position. If the effective subscanning position, a step S205 follows, and if being an invalid position, the operational flow returns to the aforesaid step S203.

Furthermore, at a step S205 the CCD integration starts, and when a given integration time for the CCD integration is elapsed (the end of the CCD integration), the charge accumulated in the CCD is shifted to a transfer shift gate. Then, at a step S206 a readout clock for the CCD readout is supplied to the shift gate to read out data every pixel, and after being A/D converted, the data corresponding to one line picture is stored in the RAM of the RISC 52. After this, at a step S207 the data stored in the RAM is transferred to the personal computer, then followed by a step S208 to judge, on the basis of the number of drive steps of the stepping motor, whether or not the aforesaid line picture is within the effective scene range. In this case, if not final, the operational flow returns to the step S203, and if final, the operation advances to a step S209.

Figure 14:
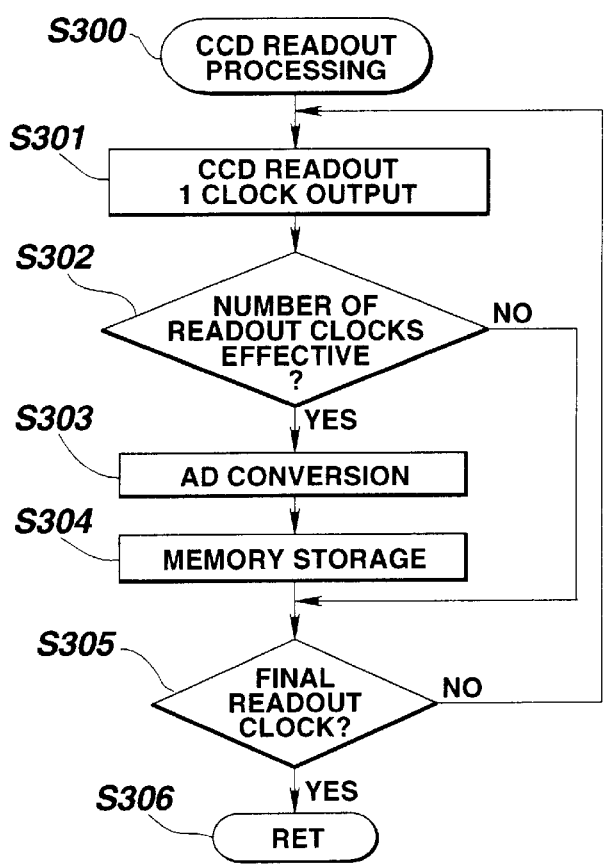
FIG. 14 is a flow chart for a more detailed explanation of CCD readout processing taken for when the decision on an effective scene is made during the CCD readout in the film scanner apparatus according to this embodiment.
Figure 15:
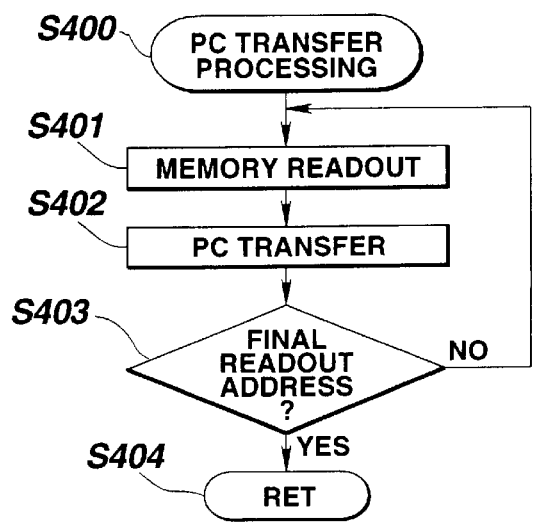
FIG. 15 is a flow chart for providing a more detailed explanation of personal computer transfer processing taken for when the decision on an effective scene is made during the CCD readout in the film scanner apparatus according to this embodiment.

FIG. 14 is a flow chart useful for a more detailed description of the CCD readout processing (see the step S206 (FIG. 11)) to be conducted when the effective scene decision is made during the CCD readout, and FIG. 15 is a flow chart available for a more detailed description of the transfer processing to the personal computer (see the step S207 (FIG. 11) to be conducted when the same effective scene decision is made during the CCD readout. First, at a step S300 in FIG. 14 a subroutine of the CCD readout processing starts, then followed by a step S301 to receive a pulse corresponding to one clock for the shift gate of the CCD and further to read out a CCD picture corresponding to one pixel. At this time, the number of inputted clocks (i.e. pulses) is counted up and stored. Subsequently, the operation proceeds to a step S302 to decide whether the number of inputted clocks for the CCD readout is effective or not. If effective, a step S303 follows for A/D conversion and a step S304 further follows to store it in the RAM of the RISC 52. On the other hand, if not effective, the operation goes to a step S305 without doing anything. At the step S305 the operation is performed in order to decide whether or not it is the number of clocks corresponding to the final pixel of the effective scene. If being the corresponding number of clocks to the final pixel, the operational flow returns through a step S306, and if not the corresponding number of clocks to the final pixel, the operational flow goes back to the step S301. Thus, it is possible to reduce the A/D conversion time and the writing time into the memory and further to possibly shorten the readout time.

Referring now to FIG. 15, at a step S400 the subroutine of the transfer processing to the personal computer starts, then followed by a step S401 to read out the RGB data corresponding to one pixel from one line picture data stored in the RAM of the RISC 52. Subsequently, at a step S402 the RGB picture data is transferred to the personal computer, then going to step S403 to decide whether or not the address at which the aforesaid RGB data is stored is the final data. If final, the operational flow returns at the step S404. On the other hand, if not final, the operational flow returns to the step S401.

Figure 16:
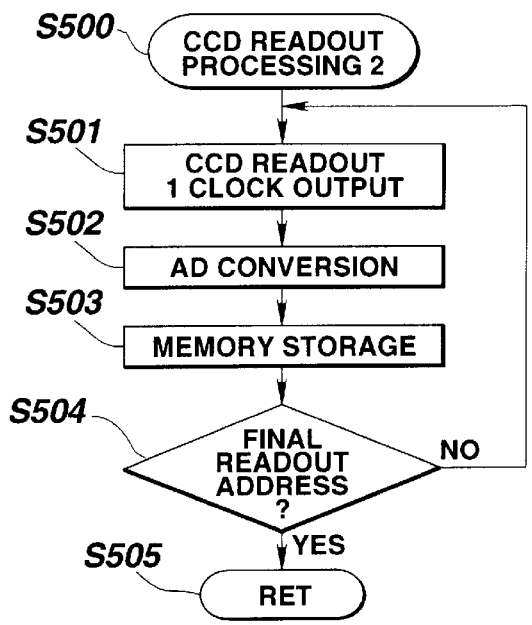
FIG. 16 is a flow chart provided for a more detailed explanation of CCD readout processing taken for when the decision on an effective scene is made at the time of the transfer by the personal computer in the film scanner apparatus according to this embodiment.
Figure 17:
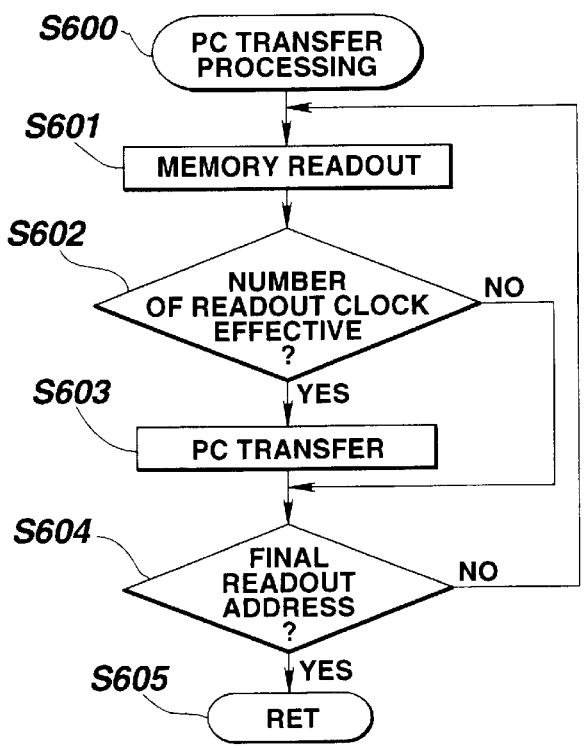
FIG. 17 is a flow chart provided for a more detailed explanation of a personal computer transfer processing taken

FIG. 16 is a flow chart for a more detailed description of the CCD read out processing (the step S206 (FIG. 11)) performed when the effective scene decision is made at the time of the transfer to the personal computer, and FIG. 17 is a flow chart for a more detailed description of the transfer processing to the personal computer (the step S207 (FIG. 11)) performed when the effective scene decision is made at the time of the transfer to the personal computer. First, at a step S500 in FIG. 16 the subroutine of the CCD readout processing starts, followed by step S501 for the input of a pulse corresponding to one clock for the CCD shift gate and further for the readout of the CCD picture corresponding to one pixel. At this time, the number of inputted clocks is counted up and stored. After this, the A/D conversion thereof is made at a step S502 and the A/D conversion result is stored in the RAM of the RISC 52 at a step S503. Thereafter, the operation advances to step S504 to decide whether or not it is the number of clocks corresponding to the final pixel of the effective scene. If the corresponding number of clocks, the operational flow returns at a step S505. On the other hand, if not the corresponding number of clocks for the effective scene is reached, the operational flow returns to the step S501.

Subsequently, referring to FIG. 17, at a step S600 the subroutine of the transfer processing to the personal computer starts, then followed by a step S601 to read out the RGB picture data corresponding to one pixel from one line picture data stored in the RAM of the RISC 52. Further, the operation proceeds to a step S602 to check whether the number of inputted clocks for the CCD readout is effective or not. If effective, step S603 is executed to transfer the RGB picture data to the personal computer, then advancing to step S604. On the other hand, if the decision of the step S602 shows that the number of inputted clocks for the CCD readout is not effective, the operation proceeds to the step S604 without doing anything. The step S604 is for checking whether or not the address at which the aforesaid RGB data is stored is the final address. If being the final data, at a step S605 the operational flow returns. If not the final address, the operational flow returns to the step S601.

As described above, the film scanner apparatus according to this embodiment can inhibit the following effects.

(1) The film scene size detection means is provided so that the effective pixels of the CCD are changed and taken at every picture of plural kinds of films different in film scene size from each other, and hence, irrespective of the kind of film to be scanned, the extremely easy-to-see picture display can be done without displaying the useless and complicated picture outside the film scene. In addition, since this is automatically done, it is possible to provide a film scanner apparatus which is convenient to use.

(2) The aforesaid picture to be displayed has a different size in accordance with the film scene size, and therefore it is possible to visually confirm the kind of film corresponding to the target picture. Further, because of being automatically achievable, it is possible to provide a film scanner apparatus which is convenient to use.

(3) The picture to be displayed has a different aspect in accordance with the film scene size, and in the manner that the sizes of the pictures are made to be substantially the same in vertical or horizontal width, it is possible to visually confirm the kind of film corresponding to the target picture and further to provide a film scanner apparatus, which is convenient to use, without losing the operation characteristic of the preview scene.

In this invention, it is apparent that working modes different in a wide range can be formed on this basis of this invention without departing from the spirit and scope of the invention. This invention is not restricted by any specific embodiment except as may be limited by the appended claims.

What is claimed is:

1. A film scanner apparatus for accepting an input of a plurality of film pictures with film scene sizes different from each other, said apparatus comprising:
   a line sensor for reading out a picture of a film scene;
   scene size decision means for determining film scene size independent of scanning a film image; and
   selection means for selecting an effective pixel of said line sensor in accordance with a decision result of said scene size decision means,
   wherein a picture display is made on the basis of the effective pixel selected by said selection means.

2. A scanner apparatus as defined in claim 1, wherein said film scene size decision means makes a decision on the basis of a decision signal from film holding means, the decision signal representing a film type in the holding means.

3. A scanner apparatus as defined in claim 1, wherein said decision means is made to be capable of making at least a decision between a 135 type film and a cartridge type film.

4. A scanner apparatus as defined in claim 1, wherein the input of a film picture is made by electrically main-scanning said line sensor while mechanically subscanning said line sensor.

5. A scanner apparatus as defined in claim 4, further comprising determination means for determining an initial position for the subscanning in accordance with a decision result of said decision means.

6. A film scanner apparatus for accepting an input of a plurality of film pictures with film scene sizes different from each other said apparatus comprising:
   a line sensor for reading out a picture of a film scene;
   scene size decision means for determining film scene size; and
   selection means for selecting an effective pixel of said line sensor in accordance with a decision result of said scene size decision means,
   wherein a picture display is made on the basis of the effective pixel selected by said selection means; and
   effective pixel reduction means for reducing outputs of said effective pixels selected by said selection means to obtain picture data, whereby said picture display is made on the basis of the output of pixels remaining after the reduction.

7. A scanner apparatus as defined in claim 6, further comprising display means for performing said picture display, said display means performing the display of the pictures of said plurality of films with the different film scene sizes at different aspect ratios.

8. A film scanner apparatus for accepting an input of a plurality of film pictures with film scene sizes different from each other, said apparatus comprising:
   a line sensor for reading out a picture of a film scene;
   scene size decision means for determining film scene size; and
   selection means for selecting an effective pixel of said line sensor in accordance with a decision result of said scene size decision means,
   wherein a picture display is made on the basis of the effective pixel selected by said selection means, wherein said selection means performs an analog-to-digital conversion of an analog output signal from only said selected effective pixels of said line sensor and stores the converted digital output signal in storage means.

9. A film scanner apparatus for accepting an input of a plurality of film pictures with film scene sizes different from each other, said apparatus comprising:
   a line sensor for reading out a picture of a film scene;
   scene size decision means for determining film scene size; and
   selection means for selecting an effective pixel of said line sensor in accordance with a decision result of said scene size decision means,
   wherein a picture display is made on the basis of the effective pixel selected by said selection means, wherein said selection means performs an analog-to-digital conversion of analog output signal from all pixels of said line sensor and stores the converted digital output data in storage means and outputs said digital data corresponding to said effective pixel.

10. A film scanner apparatus for accepting an input of a plurality of film pictures with film scene sizes different from each other said apparatus comprising:
   a line sensor for reading out a picture of a film scene;
   scene size decision means for determining film scene size; and
   selection means for selecting an effective pixel of said line sensor in accordance with a decision result of said scene size decision means, wherein a picture display is made on the basis of the effective pixel selected by said selection means, wherein a portion of said plurality of films has, in addition to a recorded picture, a recording section for recording scene size data, and said scanner apparatus further comprises readout means for reading out said scene size data recorded in said recording section, when displaying a picture of said effective pixel, to superimpose a scene size read out by said readout means on the displayed picture.

11. A film scanner system equipped with a picture input unit which accepts an input of a plurality of film pictures with different film scene sizes and a display unit for displaying a picture taken through said picture input unit, said system comprising:

a line sensor for reading out said film pictures;

scene size decision means for making a decision on distinguishing between a first film scene size and a second film scene size independently of a need for scanning image film planes; and selection means for selecting an effective pixel of said line sensor in accordance with a decision result of said decision means, wherein said display unit provides a display on the basis of outputs of effective pixels selected by said selection means.

12. A film scanner system as defined in claim 11, wherein said display unit provides a display so that a display picture based upon said first film scene size differs in dimension from a display picture based upon said second film scene size.

13. A film scanner system as defined in claim 11, wherein said display unit provides a display so that one side of a scene of said first film scene size is equal in length to one side of a scene of said second film scene size, said one sides corresponding to each other.

14. A film scanner system as defined in claim 11, wherein said decision means decides whether or not a film with said first film scene size is a 135 type film and further decides whether or not a film with said second film scene size is a cartridge type film.

15. A film scanner system as defined in claim 16, wherein said display unit displays a picture with a normal aspect ratio when a decision of said decision means indicates a 135 type film is detected and displays a picture with an aspect ratio of 16:9 when a cartridge type film is detected.

16. A film scanner system equipped with a picture input unit which accepts an input of a plurality of film pictures with different film scene sizes and a display unit for displaying a picture taken through said picture input unit said system comprising:

a line sensor for reading out said film pictures;

scene size decision means for making a decision on distinguishing between a first film scene size and a second film scene size; and selection means for selecting an effective pixel of said line sensor in accordance with a decision result of said decision means, wherein said display unit provides a display on the basis of outputs of effective pixels selected by said selection means and effective pixel reduction means for reducing data from said effective pixels in obtaining picture data from pixels within an effective pixel range, said display unit providing a display on the basis of outputs of pixels remaining after the reduction.

17. A film scanner system as defined in claim 16, wherein said reduction means sets a reduction rate so that a display picture with said first film scene size is substantially equal in number of pixels to a display picture with said second film scene size in a main scanning direction.

18. A film scanner system equipped with a picture input unit which accepts an input of a plurality of film pictures with different film scene sizes and a display unit for displaying a picture taken through said picture input unit, said system comprising:

a line sensor for reading out said film pictures;

scene size decision means for making a decision on distinguishing between a first film scene size and a second film scene size; and selection means for selecting an effective pixel of said line sensor in accordance with a decision result of said decision means, wherein said display unit provides a display on the basis of outputs of effective pixels selected by said selection means, wherein said decision means decides whether or not a film with said first film scene size is a 135 type film and further decides whether or not a film with said second film scene size is a cartridge type film and wherein said display unit displays an aspect frame on the basis of film magnetic information when the decision of said decision means is made as being said cartridge type film.

19. A film scanner apparatus which accepts an input of a plurality of film pictures with different film scene sizes, comprising:

a film picture extraction unit having a line sensor for reading out a picture of a film scene; and a film holding device used in connection with said film picture extraction unit for holding a film, wherein said film picture extraction unit has a contact to be connected to said film holding device and a computer for controlling extraction of the picture, said computer determining a scene size of said film held through said contact in said film holding unit and selecting an effective pixel of said line sensor in accordance with a scene size decision result.

20. A film scanner apparatus as defined in claim 19, wherein said computer changes a reduction rate of pixels of said line sensor in accordance with said film scene size.

* * * * *

UNITED STATES PATENT AND TRADEMARK OFFICE
CERTIFICATE OF CORRECTION

PATENT NO. : 6,172,704 B1
DATED : January 9, 2001
INVENTOR(S) : Keiji Kunishige

It is certified that error appears in the above-identified patent and that said Letters Patent is hereby corrected as shown below:

Column 3,
Line 41, after the word "film", insert therefor -- size --.

Column 7,
Line 20, replace "409" with -- 409a --.

Column 9,
Line 8, after the word "reliability", delete "increase" and insert therefor -- increases --.

Column 11,
Line 50, after the word "position", insert therefor -- is reached --.

Column 12,
Line 19, after the word "to", delete "a".
Line 56, after the word "at", delete "a".
Line 59, after the word "clocks" insert therefor -- for the effective scene is reached --.

Signed and Sealed this

Twenty-seventh Day of November, 2001

Attest:

NICHOLAS P. GODICI
Attesting Officer
Acting Director of the United States Patent and Trademark Office